No. 705,238. Patented July 22, 1902.
T. B. HATCH.
ELECTRICAL MACHINE.
(Application filed Nov. 15, 1901.)

(No Model.) 2 Sheets—Sheet 1.

Witnesses:

Inventor:
Tracy B. Hatch,
By Dyrenforth, Dyrenforth & Lee,
Attys.

No. 705,238. Patented July 22, 1902.
T. B. HATCH.
ELECTRICAL MACHINE.
(Application filed Nov. 15, 1901.)

(No Model.) 2 Sheets—Sheet 2.

Witnesses:

Inventor:
Tracy B. Hatch,
By Dyrenforth, Dyrenforth & Lee.
Attys.

UNITED STATES PATENT OFFICE.

TRACY BARBOUR HATCH, OF MENOMONIE, WISCONSIN, ASSIGNOR TO SUBMERGED ELECTRIC MOTOR COMPANY, OF MENOMONIE, WISCONSIN, A CORPORATION OF WISCONSIN.

ELECTRICAL MACHINE.

SPECIFICATION forming part of Letters Patent No. 705,238, dated July 22, 1902.

Application filed November 15, 1901. Serial No. 82,377. (No model.)

*To all whom it may concern:*

Be it known that I, TRACY BARBOUR HATCH, a citizen of the United States, residing at Menomonie, in the county of Dunn and State of Wisconsin, have invented a new and useful Improvement in Electrical Machines, of which the following is a specification.

My invention relates to an improvement in the construction of controlling resistance mechanisms as applied to dynamo-electric machines; and my object is to provide the controlling resistance mechanism as a part of the structure of the machine to render the machine self-contained in the sense that the whole forms a single compact structure.

In the accompanying drawings I show my invention applied to a motor-generator constructed for the purpose of reducing or converting a high-pressure current of small quantity to a low-pressure current of large quantity to adapt it more especially for charging storage batteries from commercial pressures. While my improvements are especially desirable upon motor-generators, they are not limited thereto, but may be advantageously applied to electric machines of the general class above defined.

Figure 1:
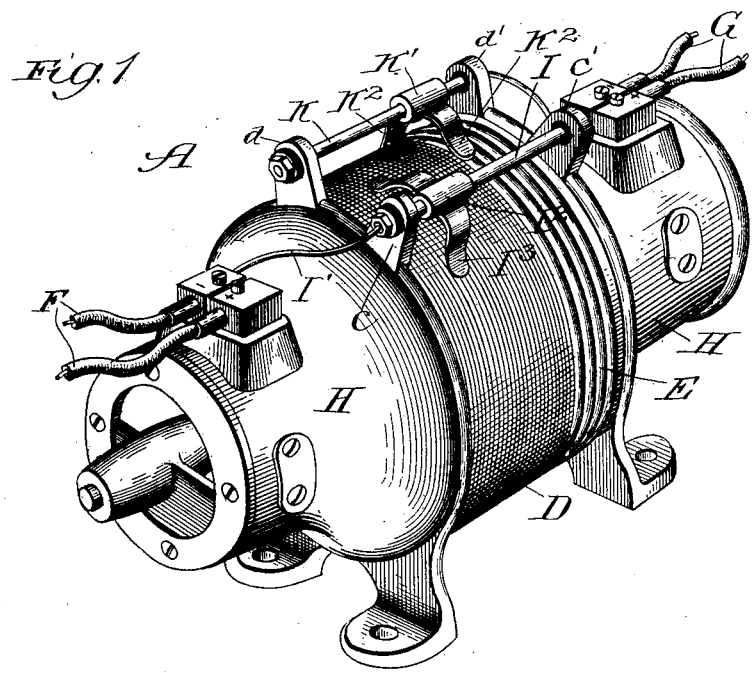
Figure 2:
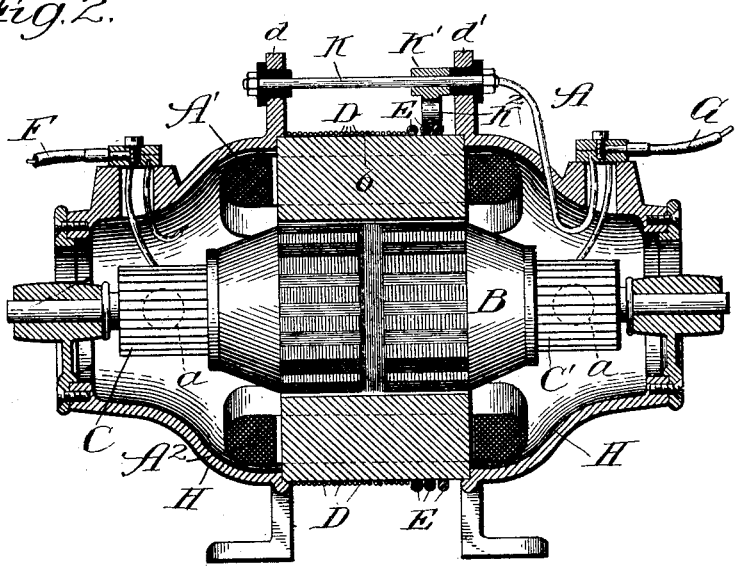
Figure 3:
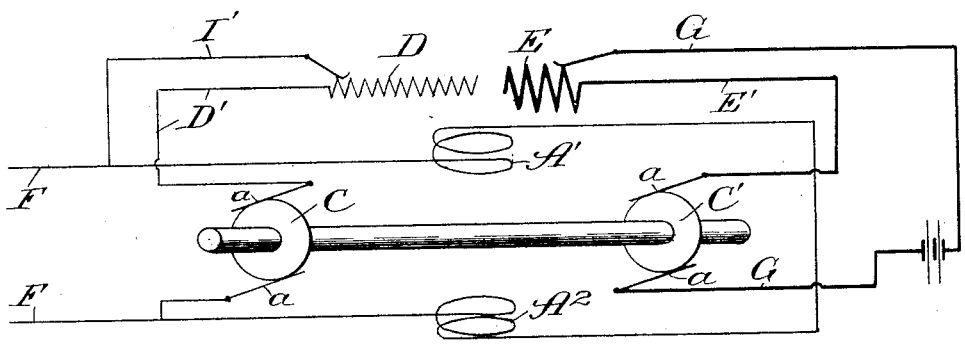

Referring to the drawings, Figure 1 is a perspective view of a motor-generator constructed in accordance with my improvements; Fig. 2, a longitudinal section of the same; Fig. 3, a diagrammatic representation of the electric circuit in a motor-generator constructed with a shunt-field as herein shown, and Fig. 4 a perspective view of a motor-generator with my improvements in the form I prefer to provide more particularly in the case of a comparatively large device.

A is the field structure; A' A$^2$, the field-magnet windings; B, a double-wound armature; C C', the commutators, and $a$ $a$ the commutator-brushes. The field structure is provided with a cylindrical outer face $b$, carrying a motor resistance-winding D, consisting of a number of turns of comparatively small wire for high pressure, and a generator-regulating resistance-winding E, consisting of several turns of comparatively large wire for low pressure.

F F are power-circuit wires, and G G are the wires leading to the storage battery to be charged and comprising the battery-circuit. As shown in the diagram Fig. 3, the power-circuit wire passes directly to the field-winding A', thence to the field-winding A$^2$, and out. The motor resistance-winding D communicates through a wire D' with one of the brushes $a$ at the commutator C. The other brush $a$ at the commutator C communicates directly with the return-wire F.

On the heads H H of the field structure are ears $c$ $c'$, supporting a rod I parallel with the face $b$ of the field structure. The rod I is insulated from the ears $c$ $c'$ and is connected by a wire I' with the power-circuit wire F. On the rod I is a sliding sleeve I$^2$, carrying a pair of spring contact strips or fingers I$^3$, which press upon the resistance-winding D. In starting the motor the contact-fingers I$^3$ may be slid along the rod I to produce the desired resistance and then moved back to the position desired to maintain the resistance wanted or cut it out entirely. Also on the heads H of the field structure are ears $d$ $d'$, supporting a rod K, to extend parallel with the face $b$ of the field. The rod K is insulated from the ears $d$ $d'$ and communicates with the battery-circuit wire G. The generator-regulating resistance-winding E is connected by a wire E' with one of the brushes $a$ at the commutator C', while the other brush $a$ is connected to the return end of the battery-circuit wire G. On the rod K is a sliding sleeve K', carrying spring contact fingers or strips K$^2$, which bear against the winding E. The contacts K$^2$ may be moved along the wire E to bring one or more turns into the circuit, and thereby regulate the resistance in the battery-circuit.

Figure 4:
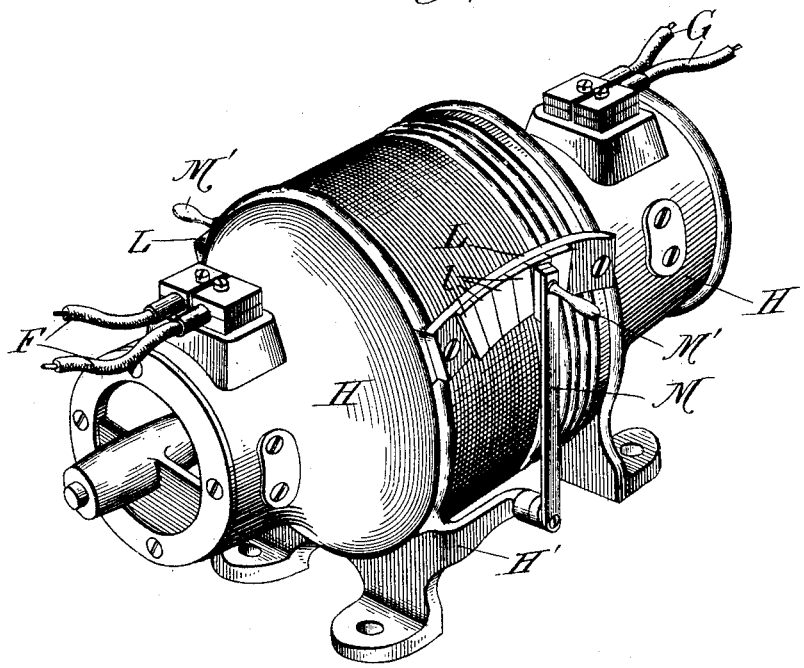

In the construction shown in Fig. 4 I substitute segmental plates L on opposite sides of the field structure, fastened at their opposite ends to the heads H. The plate on one side has contacts $l$ communicating with the progressive turns of the motor resistance-winding, while the plate on the opposite side has similar contacts communicating with the progressive turns of the generator resistance-winding. On the heads H are arms or brackets H', supporting pivotal switch-bars M, having handles M'. The switch-bar M, movable along the motor resistance-contacts, is connected with the shunt-wire I', while the switch-bar on the opposite side is connected with the battery-circuit G.

Although I have shown my improvements in connection with a circuit using a shunt-field, it may be employed upon an electric machine having a series field—that is to say, wherein the field-winding is in series with the motor-winding. My improvements may also be applied to an electric machine having a stationary armature and revolving field. It is necessary, of course, that the resistance-windings shall be upon the stationary or reactive member of the device, and this may be either the field or the armature, and the movable contacts or switches must be mounted upon a support either fixed to or in fixed relation to the stationary or reacting member to form parts of a single compact structure. It will be obvious, therefore, that while I prefer to construct my improvements as shown and described they may be variously modified without departing from the spirit of my invention as defined by the claims.

What I claim as new, and desire to secure by Letters Patent, is—

1. In a motor-generator, a motor resistance-winding for high pressure wound about and exposed upon the frame of the machine, and a regulating-resistance low-pressure winding for the generator exposed upon the machine, and switch devices on the frame of the machine connected respectively with the motor and generator circuits and movable along the said resistance-windings, substantially as and for the purpose set forth.

2. In a motor-generator, constructed as shown and described, a resistance-wire for the motor and a regulating resistance-wire for the generator, both wound about the field structure, and switch devices mounted upon the frame of the machine and movable along said resistance-windings, substantially as and for the purpose set forth.

TRACY BARBOUR HATCH.

In presence of—
JOHN HOPWOOD,
WILLIAM H. ALLEN.